June 24, 1952  A. O. GOLDSTEIN  2,601,606
FRUIT JUICE EXTRACTOR

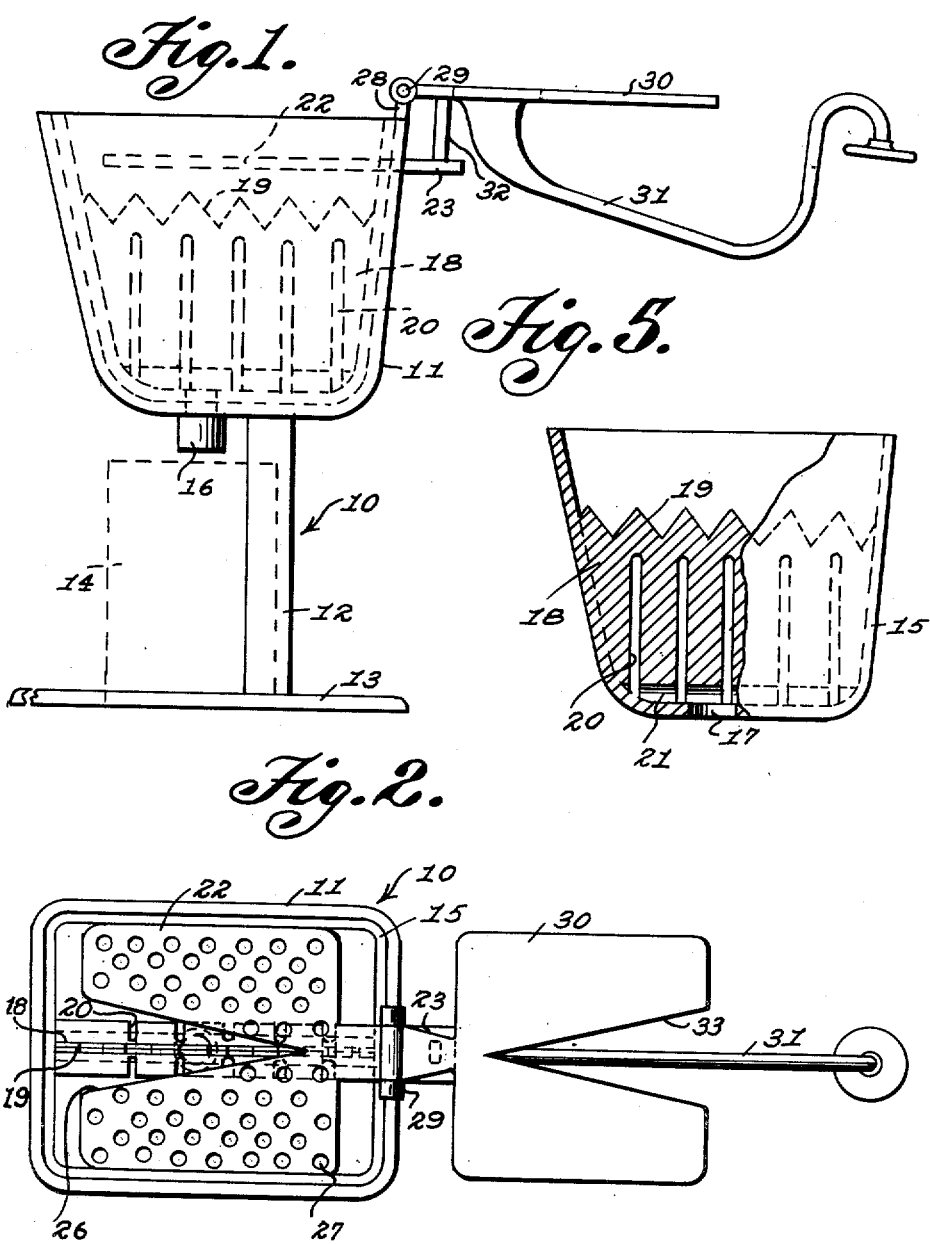

Filed Jan. 5, 1948  2 SHEETS—SHEET 2

INVENTOR.
Adolph O. Goldstein
BY Victor J. Evans & Co.
ATTORNEYS

Patented June 24, 1952

2,601,606

UNITED STATES PATENT OFFICE 2,601,606

FRUIT JUICE EXTRACTOR

Adolph O. Goldstein, Santa Cruz, Calif.

Application January 5, 1948, Serial No. 586

1 Claim. (Cl. 100—41)

This invention relates to a fruit juice extractor which is especially adapted for extracting the juice from citrous fruit, employing means for severing the fruit prior to the extraction of the juice therefrom, employing pressure plates for engaging the fruit at the top and bottom thereof for extracting the juice and employing one of the pressure plates as a strainer to strain the pulp and seeds from the juice extracted.

The extractor as constructed, in accordance with the invention, will, therefore, simultaneously sever the fruit and extract and strain the juice from the fruit with one manual operation.

With the above details, and advantages arising from the assembly of these details, in mind, the invention consists of the novel details of construction, arrangement and combination of parts more fully hereinafter described, claimed and illustrated in the accompanying drawings in which:

Figure 1 is an elevational side view of an embodiment of the invention;

Figure 2 is a top plan view of Figure 1;

Figure 5 is an elevational view partly in section of the removable cup of the device.

Figure 3:
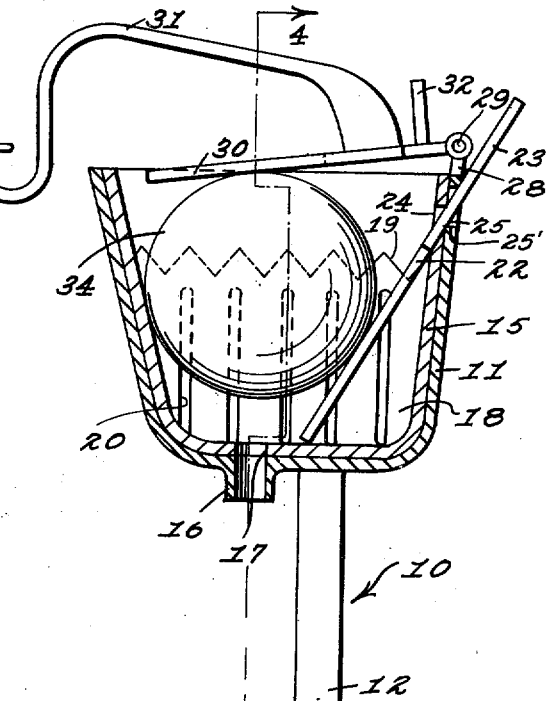
Figure 3 is an elevational view partly in section to show the various elements of the device.
Figure 4:
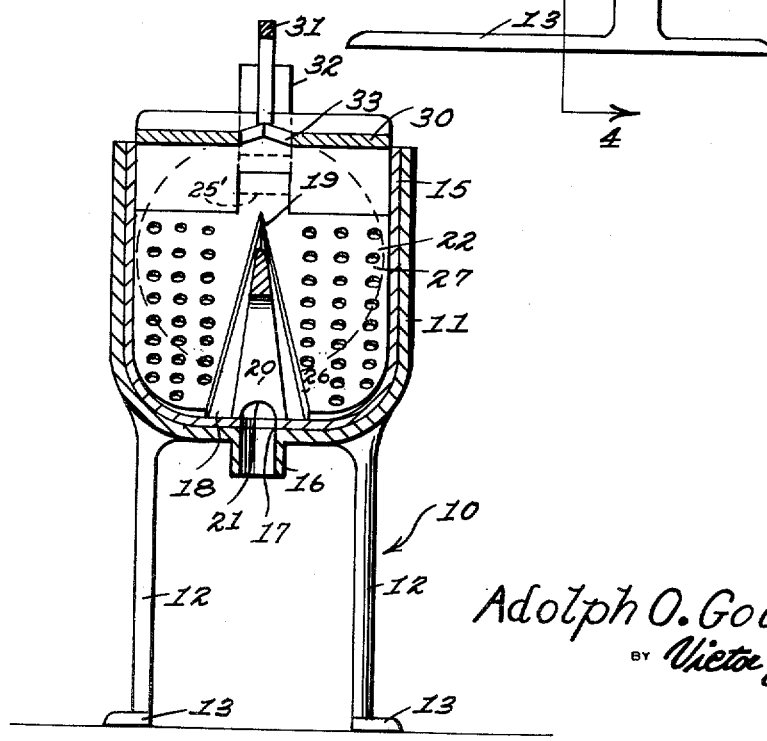
Figure 4 is a sectional view on the line 4—4 of Figure 3.

Referring more in detail to the drawings, the reference numeral 10 designates the fruit juice extractor embodying the invention.

The extractor 10 embodies a cup-shaped housing or hopper 11, which is supported in elevated position above a suitable plane surface by means of relatively spaced vertically inclined legs 12.

The legs 12 are each provided with a foot or base 13, which retains the extractor in upright position. The legs 12 are spaced sufficiently apart to permit a glass or similar container 14 to be placed therebetween.

Removably positioned within the housing 11, is a removable cup 15, which, on its exterior surface, conforms to the contour of the interior surface of the housing 11.

The housing 11 is provided with a dispensing spout 16, at the bottom thereof, and the cup 15 has an outlet opening 17 in its bottom in alinement with the spout 16.

Formed integrally with the cup 15, and extending from the front wall thereof to the rear wall thereof is the substantially triangular shaped fruit severing member 18. The apex of the member 18 is serrated as at 19 to engage the fruit placed thereon for the severing thereof.

Relatively spaced slots 20 are formed in the member 18, transversely thereof, and these slots extend upwardly from the bottom of the member to a point below the serrated apex 19. The bottom of the member 18 has a semi-circular shaped channel 21 forming communication between the slots 20 and the opening 17 in the cup-shaped member 15.

A pressure plate and strainer 22 is mounted for movement within the cup-shaped member 15, and the contour of the peripheral edge of the plate 22 permits swinging movement of the plate 22. At the rear of the plate 22, there is formed a projection 23, which extends outwardly of the member 15 through the elongated opening 24 in the rear wall thereof, and the housing 11 through the elongated opening 25 in the rear wall thereof. The openings 24 and 25 enable the strainer to slidably extend through such openings into the cup-shaped member. The projection 23 engaging the lower edge 25' of the opening 25 forms the fulcrum for the plate 22 during the pivoted movement of the plate about the edge 25' of the opening 25.

Positioned centrally of the plate 22, is the V-shaped cutout or slot 26 which, during the movement of the plate 22, will straddle the member 18. The plate performs its juice extracting operation by means of the staggered relatively spaced rows of perforations 27.

Extending upwardly from the upper edge of the rear wall of the housing 11, is the projection 28 which, at its upper end, forms the hinge means 29 for the pressure plate 30.

On its upper surface, the plate carries the lever handle 31 for the operation of the plate and rearwardly of the point of connection of the handle with the plate 30, there is formed the upstanding projection 32. The plate 30, centrally thereof, is provided with the V-shaped cutout or slot 33 which, in the operation of the plate 30, will straddle the member 18 in like manner as does the plate 22.

In operation, the plate 30 is moved into the position shown in Figure 1. In this position, the projection 32, on the pressure plate 30, engages the projection 23 on the plate 22 to elevate the plate to a horizontal position, as shown in Figure 1 in dotted lines.

The fruit 34 is then placed on the plate 22, and the plate 30 raised by means of the handle 31. As the plate 30 is moved upwardly and downwardly to engage the fruit, the projection 32 disengages from the projection 23, and the plate 22 assumes the position shown in Figure 3.

Downward pressure on the handle 31 causes the plate 30 to force the fruit 34 against the serrated teeth of the member 18 thereby severing the fruit in half. Further pressure of the handle 31 causes the plate 30 to compress the fruit 34 and extract the juice therefrom. The juice passes through the slots 20 in the member 18, and out the spout 16 into the container 14. The size of the slots 20 prevents seeds or pulp from being passed outwardly in the juice. When the juice has been finally extracted from the fruit, the handle 31 is moved backwardly to the position shown in Figure 1. As the plate 22 again moves into its horizontal position, it will raise the remains of the fruit outwardly of the member 15, so that when the remains are disposed of, another piece of fruit can be placed thereon and the previously described operation completed.

The extractor being made of a few parts, is easily cleaned and maintained in a sanitary condition. It is inexpensive to manufacture and durable and effective in operation.

From the foregoing description, it is believed that the construction and operation of the extractor will be apparent to those skilled in the art, and it is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

A fruit juice extractor of the type described, comprising a cup-shaped housing, a cup-shaped member in said housing, a cutter on said member, said housing having an elongated opening in the rear wall thereof, and said member having a similar opening in its rear wall, a strainer adapted to slidably extend through the openings in the rear wall of the housing and member into said member, a pressure plate pivoted to the upper rear edge of said housing, a handle on said pressure plate, said strainer having a projecting portion adapted to extend outwardly of the opening in the rear wall of the housing, and a projection on said pressure plate adapted to engage the projection on said strainer so that the projecting portion of the strainer will have pivotal movement about the lower edge of the opening in the rear wall of the housing to pivot said strainer to a horizontal plane within said member when said pressure plate is extended to full inactive position, said strainer and said pressure plate being provided with a cut-out adapted to straddle said cutter during movement of said strainer and said plate, and said housing being provided with a discharge spout, said cup-shaped member having an opening in alignment with said spout, and said cutter being provided with a channel communicating with said opening and vertically inclined slots communicating with said channel, whereby juice extracted from fruit placed in said housing is discharged outwardly thereof.

ADOLPH O. GOLDSTEIN.

REFERENCES CITED

The following references are of record in the file of this patent:

UNITED STATES PATENTS

| Number | Name | Date |
|---|---|---|
| 172,505 | Sammis | Jan. 18, 1876 |
| 620,047 | Neal | Feb. 21, 1899 |
| 1,886,250 | Bungay | Nov. 1, 1932 |
| 1,938,463 | Roberts | Dec. 5, 1933 |
| 2,168,430 | Meyers | Aug. 8, 1939 |